United States Patent [19]
Liao et al.

[11] Patent Number: 6,148,405
[45] Date of Patent: Nov. 14, 2000

[54] METHOD AND SYSTEM FOR SECURE LIGHTWEIGHT TRANSACTIONS IN WIRELESS DATA NETWORKS

[75] Inventors: Hanqing Liao, San Ramon; Stephen S. Boyle, Fremont; Peter F. King, Half Moon Bay; Bruce V. Schwartz, San Mateo, all of Calif.

[73] Assignee: Phone.com, Inc., Redwood City, Calif.

[21] Appl. No.: 08/966,988

[22] Filed: Nov. 10, 1997

[51] Int. Cl.[7] ....................................... H04N 7/67
[52] U.S. Cl. ................ 713/201; 713/150; 713/170; 380/255; 380/278; 380/282
[58] Field of Search ..................... 713/201, 150, 713/168, 170; 380/255, 278, 282

[56] References Cited

U.S. PATENT DOCUMENTS

| | | | |
|---|---|---|---|
| 5,542,046 | 7/1996 | Carlson et al. | 713/200 |
| 5,586,260 | 12/1996 | Hu | 713/201 |
| 5,923,756 | 7/1999 | Shambroom | 380/21 |
| 5,926,549 | 7/1999 | Pinkas | 380/25 |

*Primary Examiner*—Thomas R. Peeso
*Attorney, Agent, or Firm*—Alan D. Minsk; Joe Zheng

[57] ABSTRACT

The present invention is a method and system for establishing an authenticated and secure communication session for transactions between a server and a client in a wireless data network that generally comprises an airnet, a landline network and a link server therebetween. The client having limited computing resources is remotely located with respect to the server and communicates to the server through the wireless data network. To authenticate each other, the client and the server conduct two rounds of authentication, the client authentication and the server authentication, independently and respectively, each of the authentication processes is based on a shared secret encrypt key and challenge/response mechanism. To reach for a mutually accepted cipher in the subsequent transactions, the server looks up for a commonly used cipher and forwards the cipher along with a session key to the client. The subsequent transactions between the client and the server are then proceeded in the authenticated and secure communication session and further each transaction secured by the session key is labeled by a transaction ID that is examined before a transaction thereof takes place.

34 Claims, 8 Drawing Sheets

Microfiche Appendix Included
(3 Microfiche, 176 Pages)

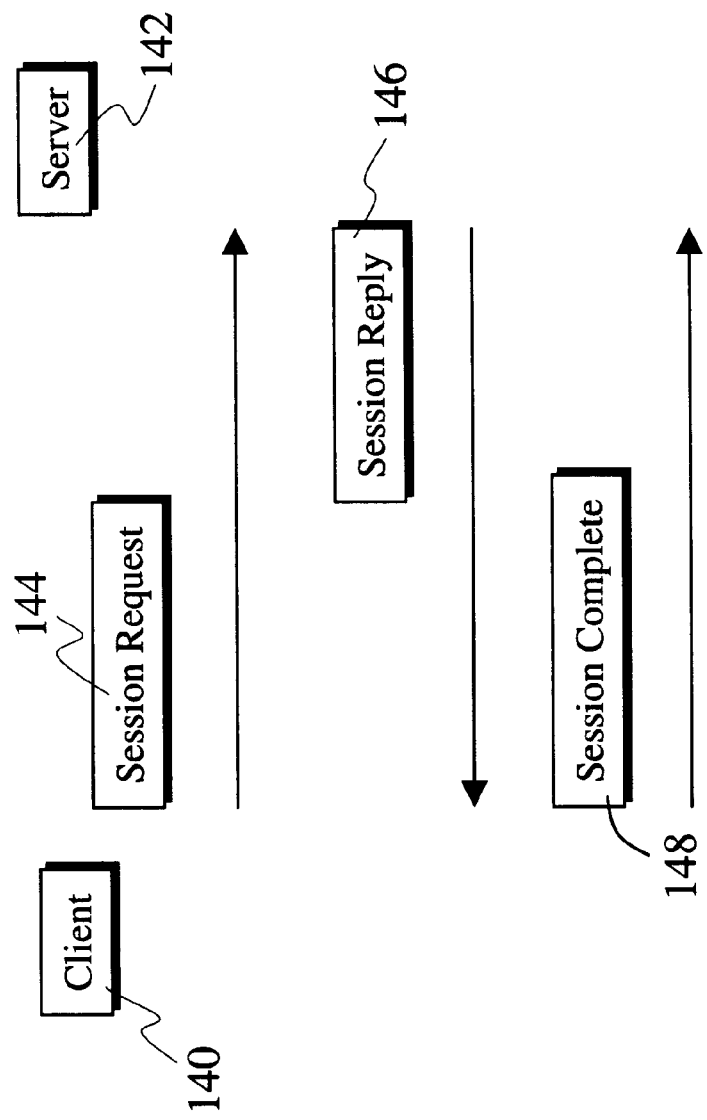

CIP = Crypto Ignition Process

CIP = Crypto Ignition Process

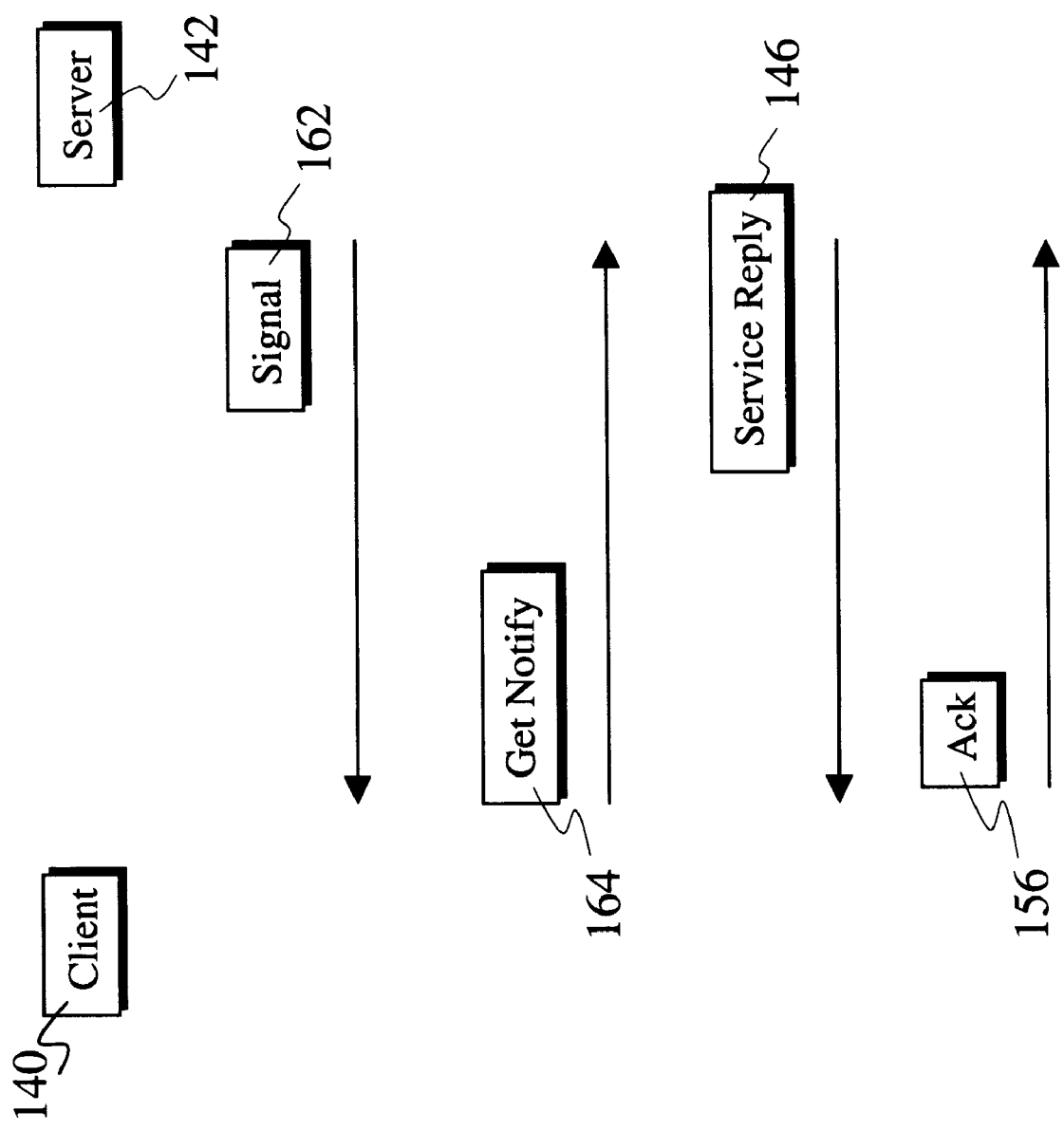

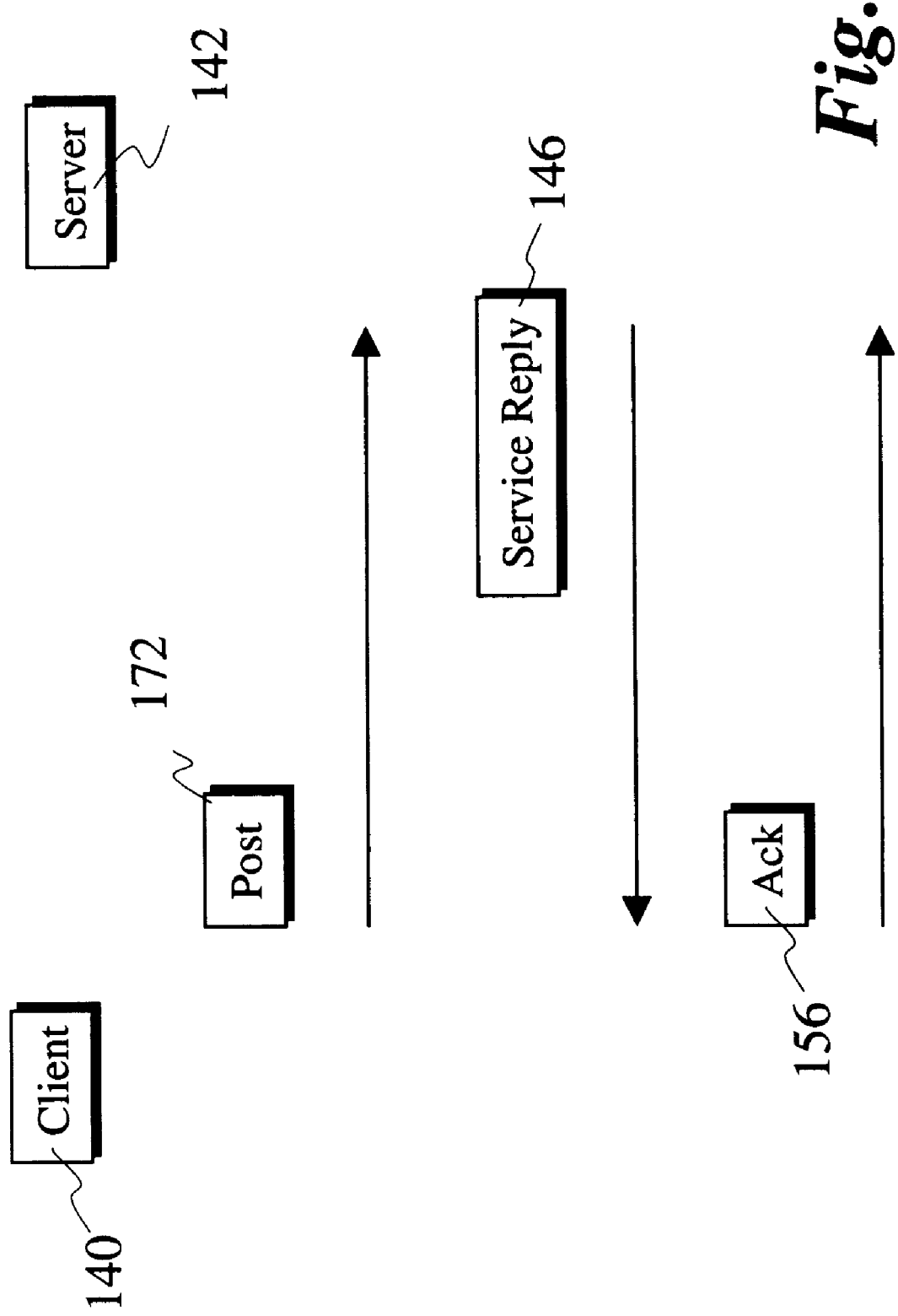

METHOD AND SYSTEM FOR SECURE LIGHTWEIGHT TRANSACTIONS IN WIRELESS DATA NETWORKS

REFERENCE TO A "MICROFICHE APPENDIX"

Appendix, which is a part of the present disclosure, is a microfiche appendix consisting of 3 sheets of microfiche having a total of 176 frames. The microfiche Appendix is a source code listing of one embodiment of the present invention, which is described more completely in the sequel.

A Portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of Invention

The invention relates to wireless data communications, and more particularly relates to secure lightweight transactions between mobile devices and landline servers over wireless data networks; wherein the mobile devices have very limited computing power, memory and graphical display capability.

2. Description of the Related Art

A fast-growing trend on the Internet is electronic commerce. The electronic commerce is an integrative concept designed to draw together a wide range of business support services, trading support systems for commodities, products, customized products and custom-built goods and services; ordering and logistic support systems; settlement support systems; and management information and statistical reporting systems, all via the Internet. It is well known, however, that the Internet is a wide open, public and international network of interconnected computers and electronic devices around the world. Anyone who has access to a computer in the network can intercept signals carrying proprietary information traveling along the network. To transact business over the open network, companies or individuals must have an efficient, reliable and secured manner to conduct private communications therebetween. Security thus becomes a primary concern over the open Internet and there have been many efforts in progress aimed at protecting the proprietary information travelling in the Internet. One of the efforts is to use cryptographic techniques to secure a private communication between two parties. The cryptographic techniques provide a way to transmit information across untrusted communication channel without disclosing the contents of the information to anyone accessing the communication channel.

U.S. Pat. No. 5,671,279 to Taher Elgamal discloses a courier electronic payment system for conducting the electronic commerce using a secure courier system. The system governs the relationship between a customer, merchant, and acquirer gateway to perform credit card purchases over the open network by using a secure connection to simplify the problem of Internet-based financial transactions. Visa International Service Association, in collaboration with Microsoft Corporation, provides a secured transaction technology using digital signature to authenticate a credit card and merchant decal, referring to http://www.visa.com for detail. The technologies developed by RSA Data Security, Inc. are the global de facto standard for public key encryption and digital signature and may be part of existing and proposed standards for the Internet as well as business and financial networks around the world. More information about the Internet security can be found at http://www.rsa.com.

The above and other ongoing efforts are all primarily targeted at the Internet that is a plurality of landline or wired networks. To use the Internet, one has to have a physical access to a computer wired into the network. To provide the mobility of the network, wireless data networks were introduced, as such the landline networks become an integral part of the wireless data networks. With the wireless data networks, people, as they travel or move about, are able to perform, through wireless computing devices or handheld communication devices, exactly the same tasks as they could do with computers in the landline networks. Similar to the Internet, however, the nature of the wireless communications provides an opportunity for intrusion since the mobile data is sent through the air. Anyone who has an appropriate receiver with a designed antenna can intercept signals being communicated between a wireless computing device and a landline base-station or network. Privacy, authentication, authorization, and integrity are thus deemed the important elements in a wireless data network. Therefore additional efforts have been started to ensure that the proprietary information is sent via wireless networks that must be restricted only to those with a need to know.

Many networks employ encryption and other security measures to protect mobile data from access by an unauthorized third party. Certain technologies and access methods contribute to network security. Spread spectrum technology, for example, is inherently secure, but it only provides a link level security. There is no guarantee that a mobile device has a secure communication to a landline device through a complete wireless network that generally comprises an airnet, the Internet and a gateway therebetween. U.S. Pat. No. 5,604,806 to Hassan, et al, discloses an apparatus and method for secure radio communication by using key sequences derived from the short-term reciprocity and radio spatial decorrelation of phase of the radio channel. U.S. Pat. No. 5,371,794 to Whitfield, et al, shows another method and apparatus for providing a secure communication between a mobile wireless data processing device and a base data processing device. The mobile device sends the base device a digitally signed mutually trusted certificate according to a public encryption key and the base device sends a modified version to the mobile device upon successfully recovering the certificate. If the mobile device recovers the modified version, both devices enter a secure data communication. The disclosed system by Whitfield may work well with mobile devices that have competitive computing resources to satisfy the public-key-based encryption speed. Nevertheless the connection time in an airnet is expensively measured and many mobile devices such as mobile phones have a small fraction of the computing resources provided in a typical desktop or portable computer. The computing power in a typical cellular phone is less than one percent of what is in a regular desktop computer, the memory capacity thereof is generally less than 250 kilobytes and the LCD display is perhaps four lines high by twelve or twenty characters, the graphics capabilities thereof are very limited or nearly nonexistent. There has been thus a great need for a generic solution that provides a secure communication with competitive performance between mobile devices of limited computing resources and landline devices through an open network.

Further many current networks operate based on Hypertext Transfer Protocol (HTTP) that is built on the Transmission Control Protocol/Internet Protocol (TCP/IP). But the TCP protocol requires considerable computing power and network bandwidth resources. A single connection, for example, may require an exchange of more than ten packets between a sender and a receiver in the Internet. Therefore there has been further a need for a generic method and system that provide a secure communication between mobile devices and landline devices using fewer number of packets so as to increase transmission efficiency in mobile devices of limited computing resources.

SUMMARY OF THE INVENTION

The present invention has been made in consideration of the above described problems. According to a preferred embodiment, the present invention is a method and system for establishing an authenticated and secure communication session for transactions between a server and a client in a wireless data network that generally comprises an airnet, a landline network and a link server therebetween. The client is remotely located with respect to the server and communicates to the server through the wireless data network. The method comprises the steps of:

(a) the client sending a session-request signal to the server for creating the session therebetween, the session-request signal comprising at least one client message encrypted according to a shared secret encrypt key;

(b) the server conducting a first client authentication by decrypting the encrypted client message according to the shared secret encrypt key upon receiving the session-request signal;

(c) the server generating a session key for the session in creation, a first derivative from the decrypted client message and generating a server message;

(d) the server sending a session-reply signal comprising the session key, the first derivative and the server message; the session key, the first derivative and the server message being encrypted according to the shared secret encrypt key;

(e) the client conducting a first server authentication by decrypting the first derivative and the server message being encrypted according to the shared secret encrypt key;

(f) the client conducting a second server authentication by validating the first derivative with the client message;

(g) the client generating a second derivative from the server message if the step (f) of the second server authentication succeeds;

(h) the server conducting a second client authentication by decrypting the second derivative and verifying the second derivative with the server message upon receiving; thereby the authenticated and secure communication session is established between the client and the server after the first and the second client authentication as well as the first and the second server authentication are all successful.

Upon the establishment of the secure communication between the client and the server, either the client or the server may initiate a transaction therebetween. To ensure the transaction between a valid session, the transaction is encrypted by a mutually accepted cipher according to the session key and identified by a session ID embedded therein. The mutually accepted cipher is obtained by the server through a cipher negotiation with the client and the transaction ID in the transaction is always examined in the server before the server responds to the client with a service reply.

Upon receiving the service reply from the server, the client can proceed the transaction with the server.

The system for establishing an authenticated and secure communication; the system comprises:

a landline network running on a first communication protocol that is usually HTTP;

at least one server coupled into the landline network and communicating with the landline network;

an airnet running on a second communication protocol that is usually HDTP;

a client remotely located with respect to the server and communicating with the airnet by radio transmission means;

a link server, coupling the airnet to the landline network, for linking the first communication protocol to the second communication protocol, whereby the client can communicate with the server;

means for generating a session-request signal comprising at least one first message encrypted according to a shared secret encrypt key; the first message usually being a first nonce represented by a first 2-byte numeral, the session-request signal being transmitted to the airnet;

means for sending a session-reply signal comprising at lease one second message encrypted according to the shared secret encrypt key; the second message usually being a second nonce represented by a second 2-byte numeral, the session-reply signal sending means comprising:

means for conducting a first client authentication when the session-request signal is received, the first client authentication comprising means for recovering the encrypted first message from the received session-request signal; and means for generating a first derivative from the recovered first message;

means for conducting server authentication upon receiving the session-reply signal, the conducting server authentication means comprising:

means for recovering the encrypted second message when the session-reply signal is received; and means for verifying the received first derivative with the first message; and means for generating a second derivative from the second message;

means for generating a session-authentication-complete signal comprising the second derivative;

means for conducting a second client authentication, the second client authentication means comprising means for verifying the received second derivative with the second message when the session-authentication-complete signal is received; and whereby the authenticated and secure communication between the client and the server is established when the first and second client authentication and the server authentication are complete.

Accordingly, an important object of the present invention is to provide a generic solution for secure lightweight transaction in wireless data networks. Other objects, together with the forgoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 3 illustrates the process of mutual authentication between a client and a sever.

FIG. 6 shows a schematic diagram of a notification transaction; and

FIG. 7 shows a schematic diagram of a post transaction.

DETAILED DESCRIPTION OF THE INVENTION

The detailed description of the present invention in the following are presented largely in data flowing representation that resemble the operations of data processing devices coupled to networks. These process descriptions and representations are the means used by those experienced or skilled in the art to most effectively convey the substance of their work to others skilled in the art. The present invention is a method and system for secure data communications. The method along with the system or architecture to be described in detail below is a self-consistent sequence of steps leading to a desired result. These steps or processes are those requiring physical manipulations of physical quantities. Usually, though not necessarily, these quantities may take the form of electrical signals capable of being stored, transferred, combined, compared, displayed and otherwise manipulated. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities.

Figure 1:
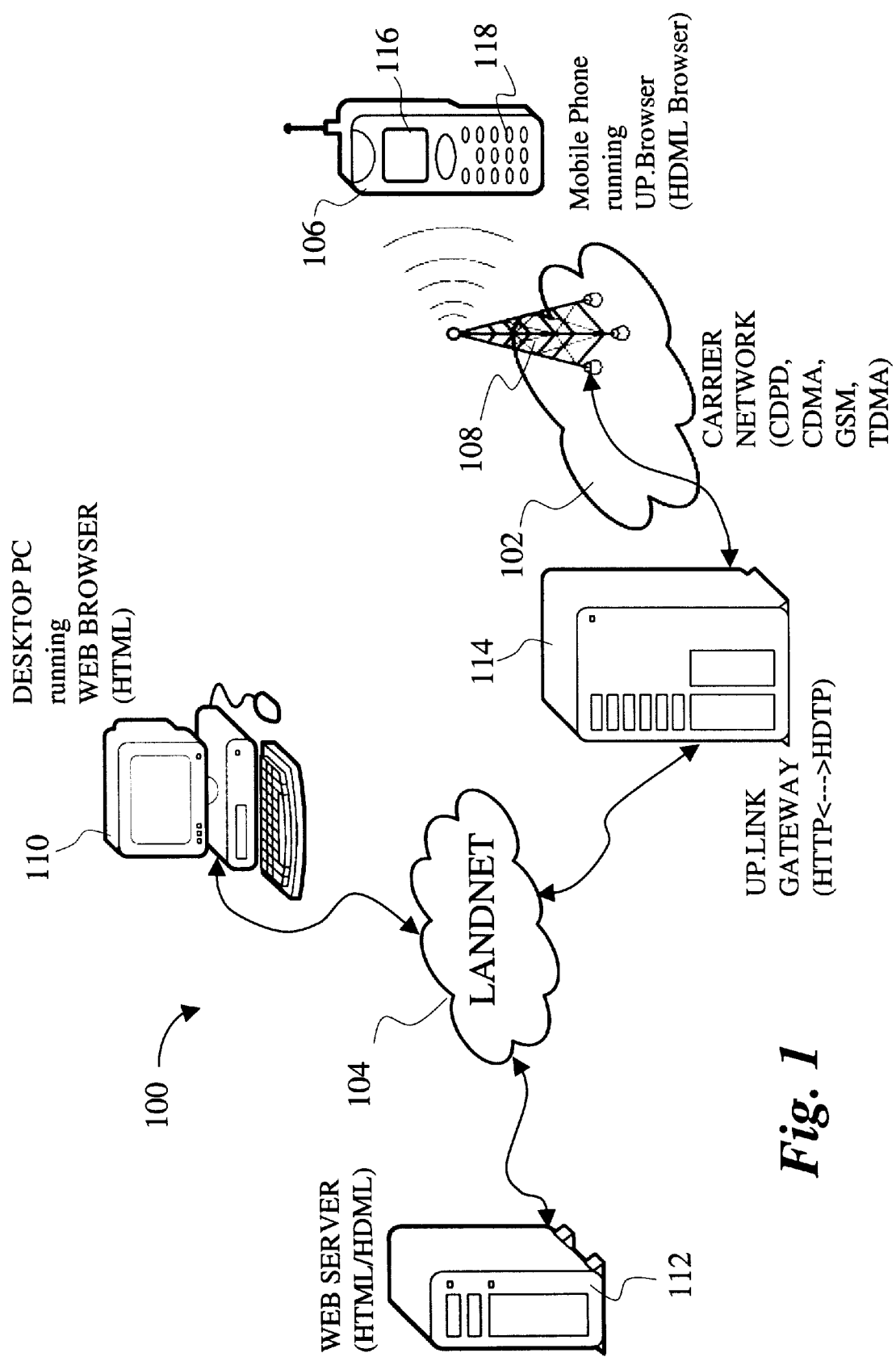
FIG. 1 shows a schematic representation of a mobile data network in which the present invention may be practiced.

Referring now to the drawings, in which like numerals refer to like parts throughout the several views. FIG. 1 shows a schematic representation of a wireless data network 100 in which the present invention may be practiced. The data network 100 comprises an airnet 102 and the landline network 104, each acting as a communication medium for data transmission therethrough. The landline network 104 may be the Internet, the Intranet or other private networks. For simplicity, the landline network 104 will be herein simply referred to as the Internet, literally meaning either the Internet or the Intranet or other private network. Further the airnet 102, meaning an unwired network in which data transmission is via the air, is sometimes referred to as a carrier network because each airnet is controlled and operated by a carrier, for example AT&T and GTE, each having its own communication scheme, such as CDPD, CDMA, GSM and TDMA. Referenced by 106 is a mobile data device, but resembling a mobile phone, in communication with the airnet 102 via an antenna 108. It is generally understood that the airnet 102 communicates simultaneously with a plurality of mobile computing devices of which a mobile phone 106 is shown in the figure. Similarly connected to the Internet 104 are a plurality of desktop PCs 110 and a plurality of web servers 112, though only one representative respectively shown in the figure. The PC 110, as shown in the figure, may be a personal computer SPL 300 from NEC Technologies Inc. and runs a web browser via the Internet 104 to access information stored in the web server 112 that may be a workstation from SUN Microsystems Inc. It is understood to those skilled in the art that the PC 110 can store accessible information so as to become a web server as well. Between the Internet 104 and the airnet 102 there is a link server 114 performing data communication between the Internet 104 and the airnet 102. The link server 114, also referred to as link proxy or gateway, may be a workstation or a personal computer and performs a protocol mapping from one communication protocol to another, thereby a mobile device 106 can be in communication with any one of the web servers 112 or the PCs 110, respectively.

The communication protocol in the Internet 104 is HTTP that runs on TCP and controls the connection of an HTML Web browser to a Web server and the exchange of information therebetween. An extended version thereof, called HTTPS, provides encrypted authentication and session transmission between a client and a server. The communication protocol between the mobile device 106 and the link server 114 via the airnet 102 is Handheld Device Transport Protocol (HDTP), or Secure Uplink Gateway Protocol (SUGP), which preferably runs on User Datagram Protocol (UDP) and controls the connection of a HDML Web browser to a link server, where HDML stands for HandHeld Markup Language. The specification thereof and the HDTP specification are provided at http://www.wapforum.org or http://www.phone.com that are incorporated herein by reference. Further a reference specification entitled "Magellan SUGP Protocol" is incorporated herein by reference. The HDTP is a session-level protocol that resembles the HTTP but without incurring the overhead thereof and is highly optimized for use in mobile devices that have significantly less computing power and memory. Further it is understood to those skilled in the art that the UDP does not require a connection to be established between a client and a server before information can be exchanged, which eliminates the need of exchanging a large number of packets during a session creation. Exchanging a very small number of packets during a transaction is one of the desirous features for a mobile device with very limited computing power and memory to effectively interact with a landline device.

Figure 2:
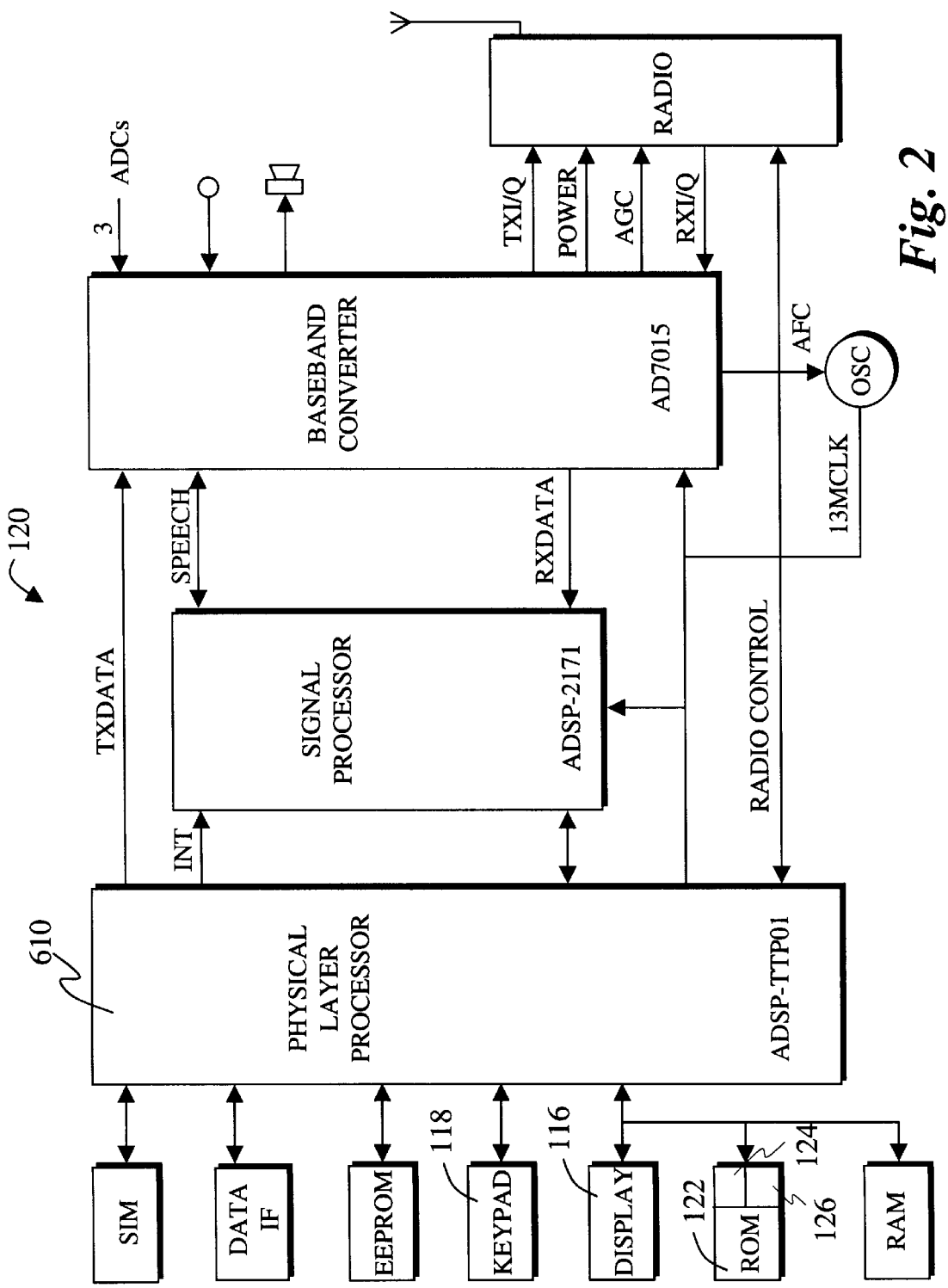
FIG. 2 depicts a block diagram of a typical GSM digital cellular phone used in the embodiment of the disclosed invention.

According to one preferred embodiment, the present invention may be practiced with a cellular phone, a typical example of the mobile device 106, that has very limited computing power and memory. The cellular phone 106 is used as a client in communication to a landline device that is often referred to as a server providing accessible information therein to other devices. FIG. 2 shows a block diagram of a typical GSM digital cellular phone 120. Each of the hardware components in the cellular phone 120 is known to those skilled in the art and so the hardware components are not to be described in detail herein. Although the user interface of the phone 120 is not shown in the figure, the mobile device 118, resembling a cellular phone, in FIG. 1 may be referenced thereto, in which referenced by 116 is a LCD screen and 118 is a key button pad, respectively. Through the screen 116 and the keypad 118 controlled by a user of the phone, the phone can be interactively communicated with a server through the airnet, link server and the Internet. According to one embodiment of the present invention, compiled and linked processes of the present invention are stored in ROM 122 as a client module 124 and support module 126. Upon activation of a predetermined key sequence utilizing the keypad 118, a physical layer processor or microcontroller 118, initiates a session communication to the server using the module 124 in the ROM 122.

To establish a secured communication between a client and a server, an authentication process must be conducted first to ensure that only interested parties are actually in the communication therebetween. The process is complete through two rounds of independent authentication, one being the client authenticated by the server, referred to as client authentication, and the other being the server authenticated by the client, referred to as server authentication. Further each authentication is completed in two separate steps for high grade of security, which will be described in detail below. The success of the mutual authentication processes provision an evidence that the two communicating parties possesses a valid shared secret encrypt key through a mutual decryption and a challenge/response mechanism. The mutual decryption mechanism comprises the steps of mutually recovering encrypted messages from two involved communicating parties. The challenge/response mechanism, referred to as nonce verification, verifies a predetermined relationship between a sent nonce and a received derivative thereof.

In one preferred embodiment of the present invention, the authentication process is conducted with three message exchanges; a Session Request (SR), a Session rePly (SP), and a Session Completion (SC). FIG. 3 illustrates a schematic representation of the authentication process. The client 140, representing a mobile device, to conduct a transaction with the server 142, representing a landline server or PC, initiates a SR 144 to be sent to the server 142 by first creating a client proto-session. A client proto-session is a session data structure that gets initialized when a session creation starts. The initialized SR 144 comprises the following information:

sessionID—an identifier identifying all requests from the client to the server; In the case of requesting a session, sessionID is always assigned to 0;

cipher—a two-byte number representing the choice of the encryption the client is currently using as there are a number of encryption schemes available in a communication protocol;

version—a one byte number representing the HDTP protocol version in use, used to determine the underlying format of the communication protocol such as PDU;

header—up to 32767 bytes, comprising token/value pairs that apply to an entire session and may be automatically applied to subsequent service requests or session specific parameters, therefor the header is generally cached in the server till the current session completes; and C-nonce—a client nonce represented with a non-repeatable number, usually 2 bytes, used for the client to conduct a following server authentication.

C-nonceModified—a modified version of the client nonce, used for the server to conduct a nonce verification in the following client authentication.

Further the cipher in the SR 144 includes an identifier to an encryption algorithm and associated parameters thereof. To be more specific, the first byte in the cipher represents an identifier to a combination of the encryption algorithm, the key size (e.g. 128-bit for US or 40-bit for foreign countries) and content of a security attachment thereto and the second byte in the cipher indicates the additional parameters related to the first byte.-For example, value 1 in the first byte indicates that the encryption algorithm is block cipher RC5, the key size thereof is 128 bit, a two byte check-sum therein is used as the MAC (Message Authentication Code), no IV (Initialization Vector for block ciphers) therefor is transmitted over the network, and padding bytes are added if necessary. The block cipher algorithm RC5 is part of the RSA's BSAFE product. It can be further appreciated that the identifier in the cipher may be assigned to a unique value to identify a non-secure session if so desired. The C-nonce is a non-repeatable number initially and randomly generated in the client and the modified version thereof, C-nonceModified, is generated from the C-nonce through an operational relationship; for example the Exclusive-OR relationship or expressed as follows:

$$C\text{-nonceModified} = 2\text{-byte-number} \oplus C\text{-nonce}.$$

It can be appreciated by those who are skilled in the art that there are many ways to get the C-nonceModified from a C-nonce, the Exclusive-OR is one of the operational relationships used in one embodiment of the present invention. Both C-nonce and C-nonceModified are encrypted using the shared secret encrypt key between the client 140 and the server 142. The purpose of the C-nonceModified is to provide the server that receives the SR with means for ensuring that C-nonce is correctly decrypted and validated by examining the C-nonce and its relationship with the C-nonceModified. Both should not be altered after a successful decryption of the C-nonce and the C-nonceModified. In other words, a SR message or signal may be expressed as follows:

SR={session ID, cipher, version, type, device ID, header, Encry[nonce, nonceModified]};

where Encry[ ] means that the parameters or contents in the bracket are encrypted accordingly. When the SR is sent by the client to the server to request a session creation, both C-nonce, C-nonceModified are encrypted according to the cipher the client is using at the time the SR is sent out.

Upon receiving the SR from the client 140, the server 142 creates a server proto session for the client 140 with a session identifier, referred to as a session ID, to identify the session context for the session just created in the server 142. A server proto-session is a session entry marked as a proto status in a session table, which indicates that the session is not authenticated and is not able to conduct any transactions with the client. It is understood to those skilled in the art that the proto-session can be kept in the RAM of the server. If a protosession already exists for that client, it is re-used. The information in the received SR is saved in the server proto-session. If the server 142 is satisfied with the fact that the client is known, namely Encry[C-nonce, C-nonceModified] in the received SR are successfully decrypted with the shared secret encrypt key, the step one in the client authentication is successful and a corresponding session key is generated and stored with the server proto session entry. It may be noted herein that many encryption schemes used in this invention, such as RC5, have a procedure that adds and validates the Message Authentication Code such as the check-sum, to assure that the encrypted message is correctly decrypted, the procedure, every time the decryption takes place, is used herein to examine the transaction integrity, namely to assure the received messages or signals are unaltered in the course of data transmission. If the step one client authentication is not successful, namely Encry[C-nonce, C-nonceModified] in the received SR are not fully decrypted or supported, the proto session is aborted and removed from the proto session table, resulting in a failed session creation. What the support means herein is the cipher proposed or used by the client is also used by the server, for example the client uses the RC5 encryption to encrypt Encry[C-nonce, C-nonceModified], to decrypt Encry[C-nonce, C-nonceModified], the server must be equipped with the same RC5 encryption capability therein. If Encry[C-nonce, C-nonceModified] can not be successfully decrypted due to other reasons such as transmission errors, the client must reinitiate a new session request to the server in order to establish a secure communication with the server. To challenge a step two server authentication subsequently at the client side, a derivative of the client nonce or C-nonce, is generated therefor. In one embodiment of the present invention, the derivative is created by adding a constant to the client nonce, for example derivative=C-nonce+1. The purpose of the derivative is to provide the client with means for reassuring that the C-nonce is correctly decrypted by the server and the server is the authenticated one it is in communication with.

Right after the successful step one client authentication, the server 142 responds to the client with a Session rePly (SP) 146 to begin a second round authentication; server authentication. The SP 146 comprises the following information:

- C-SID—a one byte number indicates the sessionID originally assigned in the client, to be more specific C-SID=0 indicates a clear text client session, C-SID=1 indicates a shared secret key encrypted session, and C-SID=2 indicates a session key encrypted session. In the context of the current description, C-SID=1.
- key—a session key to be used with a mutually acceptable encryption, and to be used for encryption and decryption in all transactions in the session;
- derivative—a number derived from the C-nonce for the client to perform the subsequent server authentication;
- S-nonce—a non-repeatable number, used for the server to conduct a following step-two client authentication; it should be noted that S-nonce is generated by the server and generally different from the C-nonce by the client; and
- cipher—a two-byte number representing the choice of the encryption the server proposes after the client proposed cipher is received. it may or may not be the same as the one used in the client, to be more specific, the cipher is the same as the one proposed by the client when the server supports the client proposed cipher, otherwise the cipher is the one currently used in the server.

In other words, the SP can be expressed as follows:

$$SP=\{C\text{-SID}, Encry[sessionID, key, S\text{-nonce}, derivative, cipher]\};$$

When the client 140 receives the SP 146 from the server 142, it performs the step one server authentication, which is considered successful if Encry[sessionID, key, S-nonce, derivative, cipher] in the received SP 146 is decrypted successfully with the shared encrypt key. If the step one server authentication fails, the client 140 discards the SP 146 and a new session creation may be started over again. Upon the success of the step one server authentication, the client 140 proceeds with the step two server authentication; namely the predetermined relationship between the C-nonce and the derivative thereof should be hold for a successful step-two server authentication:

$$C\text{-nonce}=derivative-1$$

If the C-nonce derived from the SP 146 is the same as the C-nonce originally generated by the client, the step two server authentication is successful, hence the server 142 is considered authenticated, trusted from the viewpoint of the client, and the SP 146 is accepted as a valid message, which means that the client 140 then uses the session key and other information in the SP 146 for the session being created. Only with both successful steps of the server authentication, the client 140 marks the session as committed, which means that transactions can be conducted subsequently in the session, again only from the viewpoint of the client 140. If the predetermined relationship between the client nonce and the derivative thereof does not hold, the step two server authentication fails and the received SP 146 is discarded. The client 140 may abort the session creation process if no further SP's are received and pass both steps of the server authentication during the time period allowed for a session creation. To provide the server with means for reassuring the client authentication by itself through the client, a derivative of the S-nonce, similar to the derivative of the C-nonce, is generated.

The client 140 then sends the server 142 a SC 148 to complete the session creation process. The SC 148 comprises the following information:

$$SC=\{Encry[derivative]\};$$

where the derivative is the client's response to the server nonce challenge, namely the result of the verification, the derivative is used by the server 142 for step two client authentication. Further it is noted that the SC 148 is an encrypted message, meaning that the client encrypts the information in the SC 148 according to either its own cipher or the server proposed cipher. Generally the client 140 encrypts the information in the SC 148 according to the server proposed cipher if it accepts the server proposed cipher, otherwise, it encrypts the SC according to its own cipher.

It must be noted in one embodiment of the present invention that the SC unlike the SR 144 and SP 146, is piggybacked by a following transaction request to increase data transmission efficient. The data piggybacking means that independent data units may be logically grouped together in one physical data unit to be transmitted to a receiver that recovers all the independent data units upon the receipt of the physical data unit as if all the independent data units were sent, independently and respectively, in separate physical data units.

Upon receiving of Session Complete or SC 148, the server 142 tests if the client 140 uses its own proposed cipher or the server proposed cipher by decrypting the SC twice using the two ciphers if necessary. If the server 142 decrypts the encrypted message in the SC 148 and verifies the relationship thereof with the S-nonce, the step two client authentication is succeeded. Subsequently the server 142 promotes the server proto session to the active session and the session creation process is completed; otherwise, the proto session is removed and the session creation is aborted.

Figure 4A:
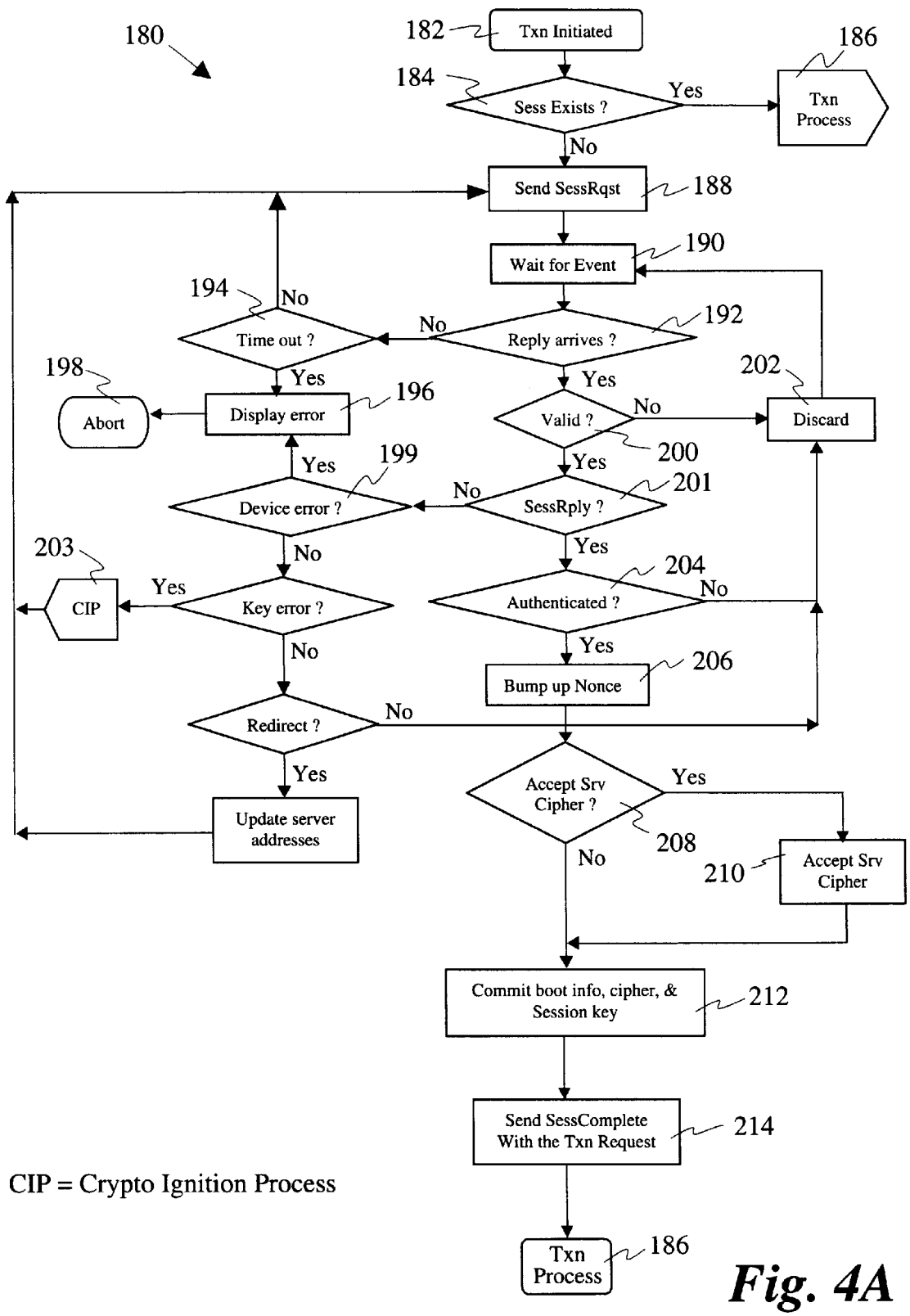
FIG. 4A and FIG. 4B depict a data flowchart representing the session creation process in the client and the server, respectively, of FIG. 3 in one embodiment of the present invention.
Figure 4B:
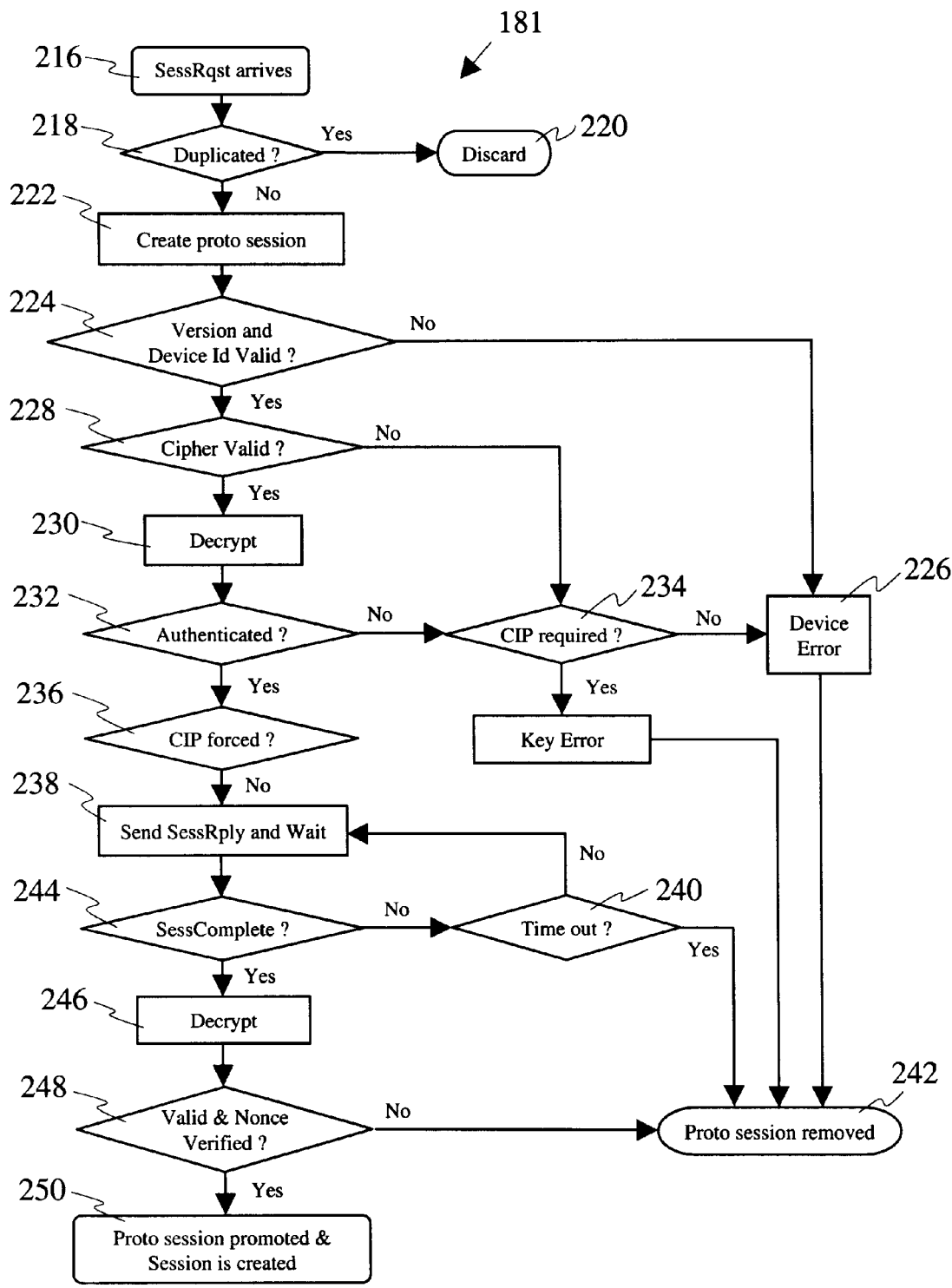

Referring now to FIG. 4A and FIG. 4B, there are shown two data flowcharts 180 and 181 representing a session creation process in the client and the server, respectively, in one embodiment of the present invention. There are generally three types of transactions that are conducted between a mobile device and a landline server; service transaction, notification transaction, and post transaction. Both service and post transactions are initiated by the mobile device that is considered as a client herein and the notification transaction is initiated by the landline server that is considered a server herein. All transactions must be conducted in the context of a valid and established session. If there is no session or valid session, a session must be created before any transaction can start. For the sake of simplicity, it is assumed that the transaction is initiated at the client side at 182. As described above, for a transaction to take place in a secure communication, a session between a client and a server must be established first. Therefore at 184, the existence of a valid session is examined. If a valid session is in place, the transaction can proceed at 186. If there is no established session, for example, a mobile device is just powered on for the first time or a previous session is beyond a time limit, for example 8 hours, a session request must be initiated and sent to the server at 188. The client is then in a mode of waiting for a reply from the server, constantly looking up for the reply at 190 and 192. If there is no reply from the server, the client may initiate another session request if a fixed time period lapses at 194 or errors occur to have to abort the initiated session request at 196 and 198. The errors occur when the client is out of a service area covered by an airnet that communicates with the server or simply either the client or the server malfunctions at 199.

Meanwhile the session request is received by the server at 216. A proto session is created at 222 per the session request from the client if the session request is not a duplicated one. It is very common that a session request may be retransmitted or re-requested by the client due to some unexpected error conditions in the wireless data network so that duplicated requests may be received. The server, however, uses a tag, which is generated from the encrypted message in the session request first received and is unique for each session request from a particular client, to prevent creating multiple proto sessions from the duplicated session requests. Some of the information in the session request, such as protocol version and device ID are verified at 224. If the verified information is not supported, there might be device error at 226, which results in the removal of the proto session just created. If the verifying process at 224 succeeds, the server proceeds a decryption process, according to a shared secret encrypt key as described above, to decrypt the C-nonce and C-nonceModified at 230. If the operational relationship between the C-nonce and C-nonceModified holds at the server side, the step one client authentication completes. CIP at 203 in FIG. 4A and 234 and 236 of FIG. 4B stands for crypto ignition process which is a process to equip a client with a updated encrypt information, for example, to update the share secret key. As the CIP is an added process and not a key element in the present invention, and no detail description thereof is provided therefore. With the successful step one client authentication, the server at 238 sends a session reply to the client.

When a server is reached and successfully processes the session request from the client, namely the step one client authentication as described above, a session reply is sent by the server to the client to start server authentication at the client side. Upon receiving the session reply from the server being connected, the client examines the reply signal at 200 and 201 and the session reply should be in a recognized format, such as uncorrupted essential information therein. If the received session reply is not recognized or supported, the client discards the received session reply at 202 and continues to wait for a valid session reply, otherwise problems with devices may be claimed in step 199. Upon receiving the session reply from the server, the client proceeds two steps of the server authentication at 204, which has been described above in detail. Logically the session is discarded at 202 if the server authentication fails, namely the client fails to decrypt and verify the encrypted S-nonce and to validate the derivative of the C-nonce generated by the server. When the server authentication passes, the client chooses either its own cipher or the server proposed cipher obtained from the session reply from the server at 208 and 210 and further the client retrieves the session key therefrom and sends a session complete signal to the server to complete the session creation at 212 and 214.

Meanwhile the server expects a session complete signal from the client it just sends the session reply to at 238. For security purpose, the server drops the proto session at 242 if the time waiting for the session complete signal goes beyond a threshold 240. Upon receiving the session complete signal at 244, the server proceeds the step two client authentication at 246 and 248 by decrypting the encrypted derivative of the S-nonce and verifying the relationship thereof with the original S-nonce. If the decryption of the derivation or the verification with the S-nonce fails, the session creation fails, hence the removal of the proto session. If the step two client authentication succeeds, that means the step one client authentication and the step one and two server authentication have all completed, the session is successfully created by promoting the proto session to the regular session at 250, thereby the transaction originally initiated by the client at 182 of FIG. 4A can proceed therefrom.

To perform transactions in an authentic and secure session, each transaction must be assigned to a transaction ID. In one embodiment of the invention, a new transaction must have a new transaction ID and has to be in a trans-sequence, namely the transaction ID must be greater than any other completed and pending transaction IDs and less than 255 at the time the new transaction is started in the session, for example, transaction ID=12 for a current transaction, the next transaction ID from the client must be 13 or greater in order for the transaction to be accepted by the server. The constant 255 is the maximum number of transactions that can be performed in a valid session. If a transaction ID is smaller than what the session expects, the transaction is discarded without notice. If the transaction ID is greater than 255, a new session is automatically created to accommodate the corresponding transaction. All the data units related to transactions are encrypted with the session key created in the session creation process and the cipher used therein is either the client proposed cipher or the server proposed cipher.

Figure 5:
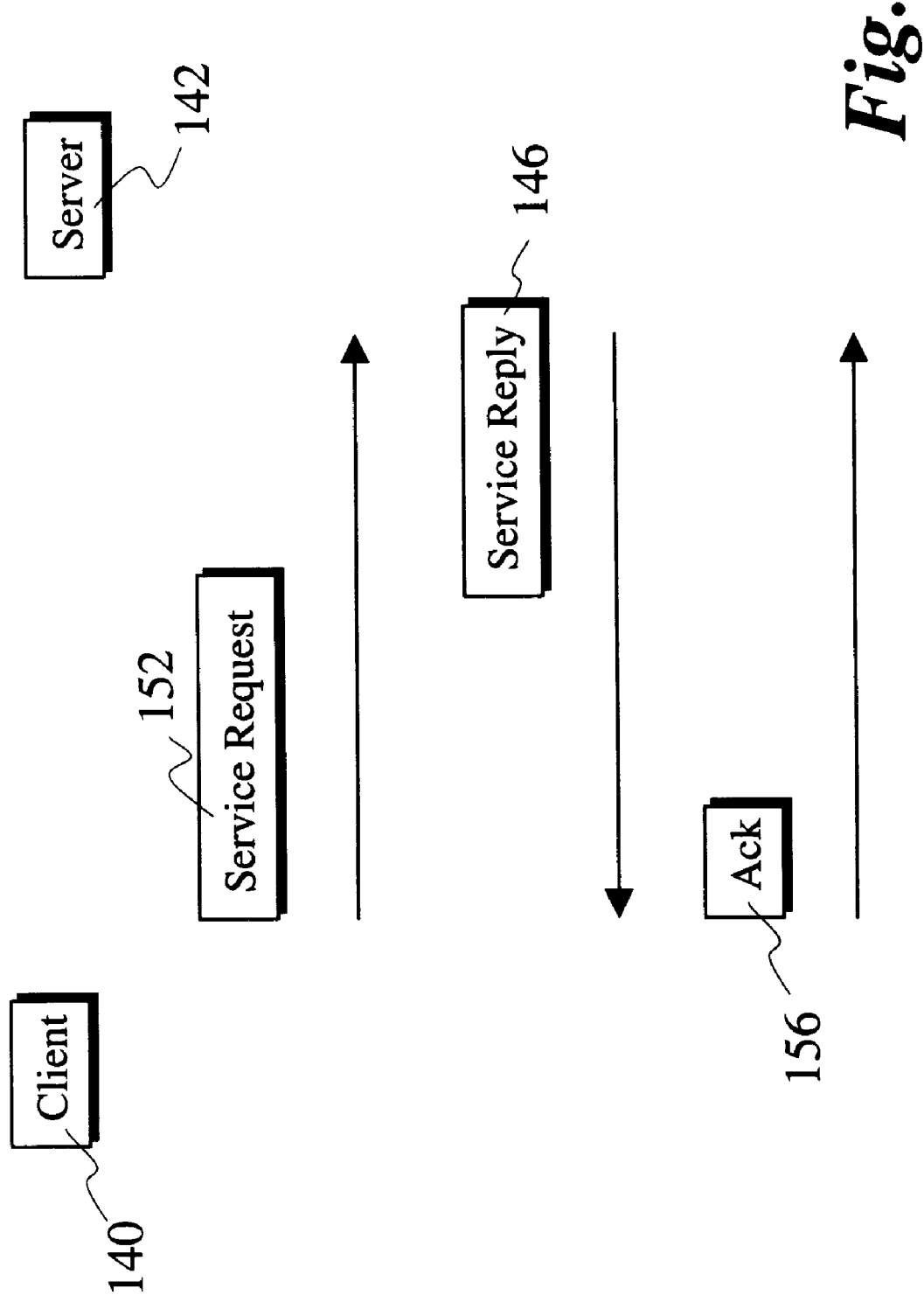
FIG. 5 shows a schematic diagram of a service transaction.

Referring to FIG. 5, there is shown a schematic diagram of a service transaction. The mobile client 140 initiates a Service Request (tSR) 152 to the server 142. A service transaction is typically involved in interaction with a service provider identified by a universal Resource Locator URL in a landline server, therefore the information in a tSR comprising URL and optional header that provides additional session information. Upon receiving the tSR 152, the server 142 processes the received tSR 152 to examine the sessionID and transaction ID therein. If the transaction ID is less than what it expects, the tSR 152 is discarded. In addition, the tSR 152 is discarded if the transaction ID in the received tSR 152 is greater that 255. As described above, for security reason, a maximum of 256 transactions is allowed in a session. If more than the allowed number of transaction occurs in one established session, a new session will be automatically initiated with the transaction ID being started from 0. Upon the successful examination of the service request tSR 152, the server 142 responds with a Service Reply (tSP) 154 that comprises a result in the form of digest of the URL service request and an optional header. Upon receiving the tSP 154 from the server 142, the client 140 sends the server 142 an acknowledge (ACK) 156 to commit the transaction if the result in the received tSP 154 is positive. Alternatively, the hand-held client can send the server a Cancel to abort the transaction. A typical example is that the client 140 requests to access information stored and identified by the URL as www.abc.com supported at the server 142, however, the URL in the tSR 152 is entered as www.abcd.com, the result in the tSP 154 returns a error message indicating the desired URL could not be found, otherwise the result in the tSP 154 shows the desired URL has been found, now it is up to the user of the client to determine if the client shall proceed with the tSP 156 or cancel to abort the current transaction to try a new or different URL.

Referring now to FIG. 6, there is shown a schematic diagram of a notification transaction. A notification transaction can be initiated by either the client 140 or the server 142. In the case of server initiation, the server 142 initiates the notification transaction by sending to the client 140 a signal data unit, or notification request (NR) 162, to inform the client 140 that there is a notification in pending in the server 142, such as an electronic mail, waiting for immediate attentions from the identified client. Upon receiving of the NS 162, the client 140 sends a Get-Notify (GN) 164 to the server 142 and retrieves its notification contents such as alerts and emails. The server 142, as in the service transaction, replies with a tSR 146. The transaction is committed after an acknowledge signal (AS) 156 is sent to the server 142 and the server 142 receives it. In the case of the client notification, the client 140 initiates the notification transaction when it powers on or switches back to the data mode from voice mode by asking the server 142 if there is any notification in pending. If there is notification in pending, the client 140 handles the notification transaction as if a signal is received. The AS 156 may be piggybacked with a GN when multiple notification transactions are conducted sequentially. If there are multiple notifications are pending at the server 142, the optional header in the tSR 146 indicates that so that the client will automatically start another notification transaction.

Referring now to FIG. 7, there is shown the post transaction. Post transaction is initiated by the mobile client 140. The post transaction is used for a mobile device to update information stored in a WWW service as specified in the URL. The client 140 sends a Post Request (PR) 172, which contains a URL, data for updating, and an optional header. The server 142 processes the PR 172 and responds to the client with a tSR 146. The result in the tSR 146 comes from the WWW service and normally indicates if information update is done. Upon receiving of the tSR 146, the client 140 sends the server 142 an AS 156 to commit the transaction. Alternatively, the mobile client 140 can send the server 142 a Cancel to abort the transaction.

The present invention has been described in sufficient detail with one exemplary embodiment. Alternative embodiments will become apparent to those skilled in the art to which the present invention pertains without departing from its spirit and scope. For example, wireless communications between a server and a personal digital assistant such as Palm Pilot from 3 Com Corporation and also a portable computer that runs under a operating system, for example, Window CE from Microsoft Corporation. Accordingly, the scope of the present invention is defined by the appended claims rather than the forgoing description of one embodiment.

What is claimed is:

1. A method for establishing an authenticated and secure communication session for transactions between a client and a server in a wireless data network, the client remotely located with respect to the server, the method comprising:

the client sending a session-request signal to the server for creating the session therebetween, the session-request signal comprising at least one client message encrypted according to a shared secret encrypt key previously residing on both the client and the server;

the server conducting a first client authentication by decrypting the encrypted client message according to the shared secret encrypt key upon receiving the session-request signal;

the server generating a session key for the session in creation, a first derivative from the decrypted client message, and a server message;

the server sending a session-reply signal comprising the session key, the first derivative and the server message, with the session key, the first derivative and the server message being encrypted according to the shared secret encrypt key;

the client conducting a first server authentication by decrypting the first derivative and the server message being encrypted according to the shared secret encrypt key; and the client conducting a second server authentication by validating the first derivative with the client message.

2. The method as recited in claim 1 wherein session-request signal further comprises a client cipher indicating what encryption the client currently uses.

3. The method as recited in claim 2 wherein session-request signal further comprises a modified version of the client message, the modified version having a operational relationship with the client message and being encrypted according to the shared secret encrypt key.

4. The method as recited in claim 3 further comprising the server negotiating a mutually accepted cipher with the client for the session in creation.

5. The method as recited in claim 4 wherein the server negotiating the mutually accepted cipher with the client comprises examining the client cipher; looking up a server cipher and determining the mutually accepted cipher.

6. The method as recited in claim 5 further comprising:

the client initiating a transaction signal comprising a transaction ID to interact with the server;

the client coupling the second derivative from the server message with the transaction signal, thereby a combined signal is formed;

the client sending the combined signal to the server;

the server conducting a second client authentication by validating the second derivative with the server message upon receiving and decoupling the combined signal; and thereby the authenticated and secure communication session is established between the client and the server after the first and second client authentication as well as the first and the second server authentication are all successful;

the server examining the transaction ID to see if the transaction ID is in a trans-sequence;

the server replying to the client with a reply signal; and the client sending an acknowledge signal to commit an transaction specified in the transaction signal initiated by the client.

7. The method as recited in claim 6 wherein the transaction request is a service-request signal comprising a URL.

8. The method as recited in claim 7 wherein the server replying to the client with a reply signal comprises contacting a service identified by the URL and sending a result in form of digest from the contacting the service identified by the URL.

9. The method as recited in claim 8 wherein the server replying to the client with a reply signal comprises contacting a service identified by the URL and sending a result in form of digest from contacting the service identified by the URL.

10. The method as recited in claim 6 wherein the transaction request is a post signal comprising a URL and editorial information.

11. The method as recited in claim 1 further comprising:

the client generating a second derivative from the server message if the second server authentication succeeds;

the client sending a session-complete signal comprising the second derivative; and the server conducting a second client authentication by validating the second derivative with the server message; and thereby the authenticated and secure communication session is established between the client and the server after the first and the second client authentication as well as the first and the second server authentication are all successful.

12. The method as recited in claim 11 further comprising:

the client initiating a client transaction request and generating a transaction ID thereof, the client transaction request being encrypted according to the session key;

the server examining the transaction ID to see if the transaction ID is in a trans-sequence upon receiving the client transaction request after decrypting the client transaction request according to the session key;

the server replying to the client with a reply signal if the server examining the transaction ID is true; and the client sending an acknowledge signal to commit a transaction specified in the client transaction signal.

13. The method as recited in claim 11 further comprising:

the server initiating a server transaction signal comprising at least one notification therein;

the client replying to the server with a get-notify signal comprising a transaction ID to fetch the notification;

the server examining the transaction ID to see if the transaction ID is in a transsequence;

the server replying to the client with a reply signal if the server examining the second transaction ID is successful; and the client sending an acknowledge signal to commit an transaction specified in the transaction signal initiated by the server.

14. A method as recited in claim 11, wherein the session-request signal further comprises a device identifier associated with the client, and wherein the server determines the shared secret encrypt key used to decrypt the encrypted client message based on the device identifier.

15. A method as recited in claim 11, wherein the session-request signal further comprises a device identifier associated with the client, wherein the server supports a plurality of clients, wherein the server stores a plurality of shared secret encrypt keys, each of the shared secret encrypt keys being associated with one of the clients, and wherein the server determines the shared secret encrypt key used to decrypt the encrypted client message based on the device identifier.

16. The method as recited in claim 1 wherein the client message is a client nonce represented by a sequence of digits.

17. The method as recited in claim 16 wherein the client nonce is a non-repeatable two-byte numeral.

18. The method as recited in claim 17 wherein the first derivative has a first relationship with the client nonce.

19. The method as recited in claim 18 wherein the session-reply signal further comprises a session ID of the session, the session key and the server cipher, all being encrypted according to the shared secret encrypt key.

20. The method as recited in claim 19 wherein the server message is a server nonce.

21. The method as recited in claim 20 wherein the second nonce is a non-repeatable two-byte numeral.

22. The method as recited in claim 21 wherein the second derivative has a second relationship with the server nonce.

23. A method as recited in claim 1, wherein the session-request signal further comprises a device identifier associated with the client, and wherein the server determines the shared secret encrypt key used to decrypt the encrypted client message based on the device identifier.

24. A method as recited in claim 1, wherein the session-request signal further comprises a device identifier associated with the client, wherein the server supports a plurality of clients, wherein the server stores a plurality of shared secret encrypt keys, each of the shared secret encrypt keys being associated with one of the clients, and wherein the server determines the shared secret encrypt key used to decrypt the encrypted client message based on the device identifier.

25. A system for establishing an authenticated and secure communication session, the system comprising:

a landline network running on a first communication protocol;

at least one server coupled into the landline network and communicating with the landline network;

an airnet running on a second communication protocol;

a client remotely located with respect to the server and communicating with the airnet by radio transmission means;

a link server, coupling the airnet to the landline network, for linking the first communication protocol to the second communication protocol, whereby the client can communicate with the server;

means, in the client, for generating a session-request signal comprising at least one client message encrypted according to a shared secret encrypt key; the session-request signal being transmitted to the airnet;

means, in the server, for sending a session-reply signal comprising at lease one server message encrypted according to the shared secret encrypt key; the session-reply signal sending means comprising:

means for conducting a first client authentication when the session-request signal is received, the first client authentication comprising means for decrypting the encrypted client message from the received session-request signal; and means for generating a first derivative from the client message;

means for conducting server authentication upon receiving the session-reply signal, the conducting server authentication means comprising:

means for recovering the encrypted server message when the session-reply signal is received; and means for verifying the received first derivative with the client message; and means for generating a second derivative from the server message.

26. The system as recited in claim 25 further comprising:

means, in the client, for generating a session-complete signal comprising the second derivative;

means, in the server, for conducting a second client authentication, the second client authentication means comprising means for verifying the received second derivative with the server message when the session-complete signal is received; and whereby the authenticated and secure communication session between the client and the server is established when the first and second client authentication and the server authentication are complete.

27. The system as recited in claim 26, further comprising:

means, in the client, for initiating a transaction request signal comprising a transaction ID; and means, in the server, for verifying the transaction ID after the transaction request signal is received.

28. The system as recited in claim 27, further comprising means, in the server, for sending a reply signal to the client and means, in the client, for acknowledging the reply signal to commit a transaction requested in the transaction request signal.

29. A method for establishing an authenticated and secure communication session for transactions between a client and a server in a wireless data network, the client remotely located with respect to the server, the method comprising:

the client sending a session-request signal to the server for creating the session therebetween, the session-request signal comprising a client session ID, a client cipher, a C-nonce and a C-nonceModified, at least the C-nonce and the C-nonceModified being encrypted by the client cipher according to a shared secret encrypt key with the server;

the server conducting a first client authentication by decrypting the encrypted C-nonce and C-nonceModified according to the shared secret encrypt key upon receiving the session-request signal;

the server generating a server session ID and a session key for the session in creation, deriving a first derivative from the decrypted C-nonce and generating a S-nonce upon examining the client session ID;

the server negotiating a mutually accepted cipher with the client for the session in creation, the negotiating comprising examining the client cipher, looking up a server cipher and determining the mutually accepted cipher therefor;

the server sending a session-reply signal comprising the session key, the first derivative and the S-nonce; the session key, the first derivative and the S-nonce being encrypted therein according to the shared secret encrypt key;

the client conducting a first server authentication by decrypting the session key, the first derivative and the S-nonce according to the shared secret encrypt key;

the client conducting a second server authentication by validating the first derivative with the C-nonce generated originally in the client;

the client generating a second derivative from the S-nonce if the second server authentication succeeds;

the server decrypting the second derivative upon receiving the second derivative that is encrypted at the client according to the shared secret encrypt key; and the server conducting a second client authentication by decrypting the second derivative and verifying the decrypted second derivative with the S-nonce upon receiving the second derivative from the client; thereby the authenticated and secure communication session for transactions between the client and the server is established.

30. The method as recited in claim 29 further comprising:

the client initiating a transaction request comprising a transaction identified by a transaction ID and encrypted by the mutually accepted cipher according to the session key; the transaction request comprising a URL identifying a service server in the wireless data network;

the server verifying the transaction ID, performing a MAC verification and replying to the client with a service reply comprising a result of contacting the service server if the transaction ID is in trans-sequence; and the client committing to the transaction request by sending an acknowledge signal to the server, thereby the transaction is complete in the authenticated and secure communication session.

31. The method as recited in claim 29 further comprising:

the server initiating a notification request comprising at least one message notification; the notification request being encrypted by the mutually accepted cipher according to the session key;

the client replying to the server with a get-notify signal comprising a transaction ID to fetch the notification;

the server examining the transaction ID to see if the transaction ID is in a transsequence;

the server replying to the client with a reply signal if the server examining the transaction ID is successful; and the client sending an acknowledge signal to commit an transaction specified in the transaction signal initiated by the server.

32. A system for establishing an authenticated and secure communication session, the system comprising:

a landline network running on a first communication protocol;

at least one server coupled into the landline network and communicating with the landline network;

an airnet running on a second communication protocol;

a client remotely located with respect to the server and communicating with the airnet by radio transmission means;

a link server, coupling the airnet to the landline network, for linking the first communication protocol to the second communication protocol, whereby the client can communicate with the server;

means, in the client, for generating a session-request signal comprising a client session ID, a client cipher, a C-nonce and a C-nonceModified, at least the C-nonce and the C-nonceModified being encrypted by the client cipher according to a shared secret encrypt key with the server; the session-request signal being transmitted to the airnet;

means, in the server, for sending a session-reply signal to the landline network, the session-reply signal comprising a server session ID, a server cipher, a S-nonce and a first derivative; at least the server cipher, the S-nonce and the first derivation being encrypted by the server cipher according to the shared secret encrypt key; the session-reply signal sending means comprising:

means for conducting a step one client authentication when the session-request signal is received, the first client authentication comprising means for decrypting the encrypted the C-nonce and the C-nonceModified from the received session-request signal; and means for generating the first derivative from the C-nonce;

means, in the client, for conducting server authentication upon receiving the session-reply signal, the conducting server authentication means comprising:

means for decrypting the encrypted server session ID, server cipher, S-nonce and first derivative when the session-reply signal is received;

means for verifying the decrypted first derivative with the C-nonce therein; and means for generating a second derivative from the S-nonce;

means, in the client, for generating a session-complete signal comprising the second derivative;

means, in the server, for conducting a second client authentication, the second client authentication means comprising means for verifying the received second derivative with the S-nonce when the session-complete signal is received; and whereby the authenticated and secure communication session between the client and the server is established when the first and second client authentication and the server authentication are complete.

33. The system as recited in claim 32, further comprising:

means, in the client, for initiating a transaction signal comprising a transaction identified by a transaction ID; and means, in the server, for verifying the transaction ID after the transaction signal is received.

34. The system as recited in claim 33, further comprising:

means, in the server, for replying to the client with a reply signal if the step of the server examining the transaction ID is successful; and means, in the client, for sending an acknowledge signal to commit the transaction specified in the transaction signal initiated by the server.

\* \* \* \* \*